Jan. 9, 1962  G. E. FRANCK  3,016,250

FITTING

Filed Aug. 15, 1958

INVENTOR.
George E. Franck,
BY
Schraeder Hogren,
Brady & Wagner Attys.

Patented Jan. 9, 1962

3,016,250
FITTING
George E. Franck, Riverside, Ill., assignor to Imperial-Eastman Corporation, a corporation of Illinois
Filed Aug. 15, 1958, Ser. No. 755,203
2 Claims. (Cl. 285—342)

This invention relates to fittings and in particular to fittings for use with tubing having an irregular outer surface.

In fittings for use with tubing having an irregular outer surface, such as seamed tubing, it is necessary to provide a sealing means which accommodates itself to the irregular surface. In known fittings for this purpose, deformable material, such as plastic lead, have been utilized. In securing such a fitting to a tube, the deformable material is forced to flow into intimate association with the irregular outer tube surface to effect the desired seal therewith. One of the difficulties with such a fitting, however, is that the cold flow characteristics of such deformable material permits the seal to deteriorate over a period of time.

More recently, certain improved materials for effecting seals have been developed. These materials include relatively hard, cold-flow-resistant plastics, such as nylon, polyvinyl chloride, and Teflon (tetrafluoroethylene polymer). The instant invention comprehends a fitting utilizing such cold-flow-resistant material in a new and improved manner to effect an improved, stable seal.

Thus, the principal object of the instant invention is to provide a new and improved fitting for use with tubing having an irregular outer surface.

Another object of the invention is to provide such a fitting having a new and improved sealing means.

A further object is to provide such a fitting having a new and improved sealing means formed of a material resistant to cold flow.

Still another object is to provide such a fitting having a new and improved means for retaining the sealing means in association with another fitting element.

A still further object is to provide such a fitting having new and improved means for effecting a plurality of sealing engagements of the fitting with the tube element.

Other features and advantages of the invention will be apparent from the following description taken in connection with the accompanying drawing wherein.

Figure 1:
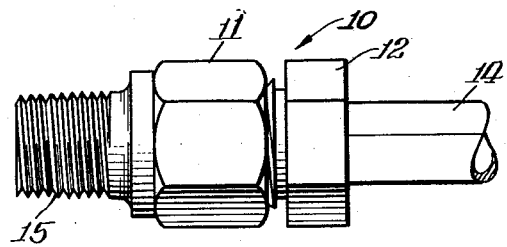
FIG. 1 is an elevation of a fitting embodying the invention associated with a portion of an irregular-surfaced tube.

In the exemplary embodiment of the invention, as disclosed in the drawing, a fitting 10 is shown to comprise a female element, or body, 11 and a male element, or nut, 12 having associated therewith a sealing insert 13. Fitting 10 is adapted for use with a tube 14 having an irregular outer surface, such as a seamed tube. The illustrated fitting 10 is arranged to be sealingly connected to the end of tube 14, and includes a suitable connecting means 15 for connecting the tube to another element (not shown). The instant invention is concerned primarily with the means for effecting the desired seal between tube 14 and the fitting 10.

More specifically, body 11 is provided with a bore 16 including an inner portion 17 having a diameter smaller than the outside diameter of tubing 14, a first enlarged cylindrical portion 18 having a diameter slightly larger than the outside diameter of tubing 14 and adapted to receive the end of the tubing, a second more greatly enlarged cylindrical portion 19, and an outer threaded portion 20. Between inner portion 17 and first cylindrical portion 18 is provided a radial shoulder 21 against which the end 22 of tubing 14 abuts; and between first cylindrical portion 18 and second cylindrical portion 19 is provided a convexly flared shoulder 23 adapted to cooperate with insert 13 to effect an improved sealing deformation of the insert.

Nut 12 is provided with an axially outer threaded portion 24 for threaded association with bore threaded portion 20 to effect a longitudinal movement of nut 12 as an incident to rotation thereof relative to body 11. To facilitate such rotation, body 11 is provided with a plurality of tool engaging surfaces 25 and nut 12 is provided with a corresponding plurality of tool engaging surfaces 26. Extending longitudinally from threaded portion 24 of nut 12 is a cylindrical portion 27 which is complementary to and receivable in body bore portion 19. Projecting coaxially from cylindrical portion 27 is an exteriorly reduced annular flange 28 having an outer surface 29 widening frusto-conically from cylindrical portion 27. The inner end 30 of flange 28 is convexly rounded. Between cylindrical portion 27 and flange 28, nut 12 is defined by a radial annular shoulder 31. Extending completely through nut 12 to be in coaxial alignment with bore 16 of the body 11, when the nut is installed in the body, is a bore 32 having a diameter substantially equal to the outside diameter of tubing 14.

Figure 2:
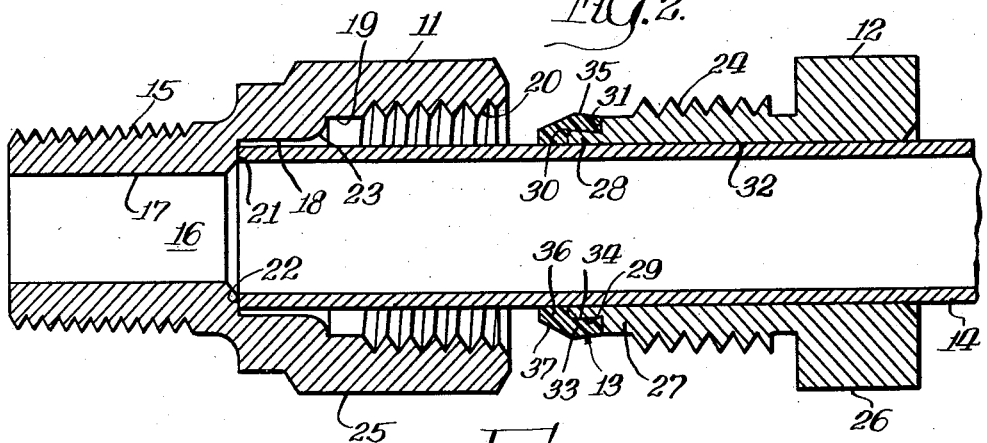
FIG. 2 is an enlarged diametric section thereof, with the fitting elements arranged as prior to assembly.

Sealing insert 13 comprises an annular element formed of a hard material which is resistant to cold flow, such as nylon, polyvinyl chloride, Teflon (tetrafluoroethylene polymer), and Kel-F (trichlorofluoroethylene polymer). Insert 13 is provided with a first, annular portion 33 abutting at one end the shoulder 31, and provided with a cylindrical inner surface 34 engaging the frusto-conical outer surface 29 of flange 28. The diameter of inner surface 34 is less than the maximum diameter of the frusto-conical surface 29, and is preferably comparable to the minimum diameter thereof adjacent radial shoulder 31. Insert portion 33 is exteriorly defined by a cylindrical surface 35 having an unstressed diameter substantially equal to the outside diameter of cylindrical portion 27 of the nut. However, as best seen in FIG. 2, when insert portion 33 is guided over flange end 30 and installed on flange 28, the insert portion is deformed outwardly by the frusto-conical configuration of nut surface 29. This deformation effects a desirable locking of insert 13 to the flange 28 precluding inadvertent loss of the insert, and further causes outer surface 35 of the insert portion 33 to be prestressed into sealing engagement with second cylindrical portion 19 of body bore 16.

Insert 13 is further provided with an annular end portion 36 extending longitudinally from first portion 33 and having an inside diameter substantially equal to the outside diameter of tubing 14. The outer surface 37 of annular end portion 36 is frusto-conical narrowing from first portion 33 and is arranged to abut flared shoulder 23 of body 11 when nut 12 is installed in the body.

Figure 3:
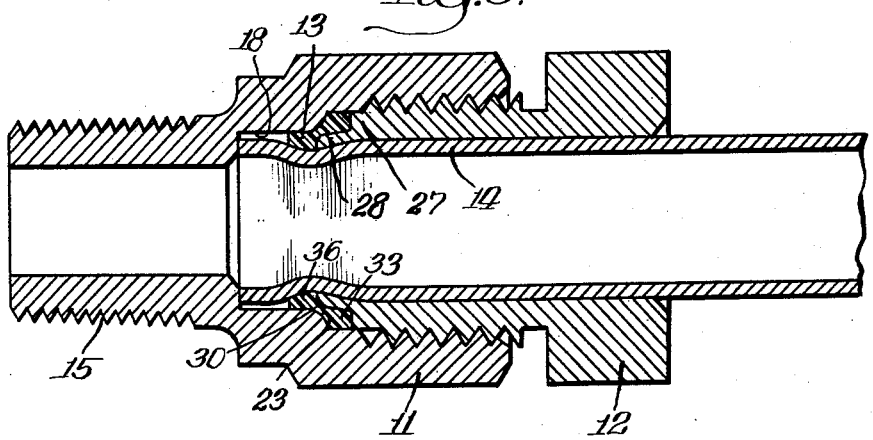
FIG. 3 is an enlarged, diametric section thereof, with the fitting elements arranged as upon completion of the assembly.

In utilizing fitting 10, nut 12 is moved over the end of tube 14 with insert 13 installed on the nut as discussed above. Tube 14 is then inserted into body 11 successively through portions 20, 19, and 18 of bore 16 until tube end 22 abuts radial shoulder 21. Nut 12 is then slid along tube 14 to enter bore 16. When nut threaded portion 24 engages body threaded portion 20, further advancement of the nut is effected by a rotation thereof relative to the body. Free advancement of the nut occurs until frusto-conical surface 37 of insert 13 engages flared shoulder 23 of the body. Continued, forceful advancement of the nut now causes the insert to be deformed radially inwardly into an intimate sealing engagement with the outer surface of tube 14, as best seen in FIG. 3. Concurrently, flange 28 is constrictively deformed about its connection to nut portion 27 to provide an augmenting sealing engagement with the tube outer surface. In addition to providing a guiding surface for facilitating installation of insert 13 on flange 28, rounded outer end 30 of the flange functions, as best seen in FIG. 3, to minimize effectively any shearing stresses exerted by flared shoulder 23 tending to sever portions 33 and 36 of the insert. Still further, rounded end 30 of the insert provides a blunt means for forcing annular end portion 36 of the insert into the narrow annular space between tube 14 and the wall of bore portion 18 thereby effecting an improved sealing compression of the insert end portion 36 between the tube and body.

Advancement of nut 12 may be continued until a substantial annular constriction of tube 14 is effected by the radially inward deformation of the insert 13 and flange 28. Thus, as best seen in FIG. 3, the nut and insert are positively locked on the tube end. As the insert is formed of a material resistant to cold flow, the sealing engagement thereof with the irregular outer surface of tube 14 is permanently maintained to provide a high pressure connection, such as capable of handling up to 5,000 pounds per square inch.

While I have shown and described one embodiment of my invention, it is to be understood that it is capable of many modifications. Changes, therefore, in the construction and arrangement may be made without departing from the spirit and scope of the invention as defined in the appended claims.

I claim:
1. A fitting for use with tubing having an irregular outer surface, comprising: a female element provided with a bore having an axially inner portion adapted to receive an end of the tubing with which the fitting is to be used, an intermediate enlarged cylindrical portion, an axially outer enlarged threaded portion, and a rounded shoulder between said inner and intermediate portions; a male element provided with an axially outer threaded portion for engaging said bore threaded portion, a cylindrical portion complementary to and receivable in said bore intermediate portion, a constrictible reduced annular flange extending coaxially and widening frusto-conically from the last named cylindrical portion and having a convexly rounded end, a radial shoulder between said cylindrical portion of the male element and said flange, and a bore through said male element extending coaxially of the female element bore and having an original diameter substantially equal to the outside diameter of the tubing with which the fitting is to be used; and an annular insert secured to said flange, said insert being formed of a plastic sealing material having resistance to cold flow and provided with an axially outer first portion having a recess grippingly receiving said flange of the male member, the unstressed diameter of said recess being less than the maximum diameter of said flange, said first portion of the insert being further provided with a radially outer cylindrical surface having an unstressed diameter substantially equal to the diameter of said cylindrical portion of the male element and a radial outer end face abutting said radial shoulder of the male element, said insert further having an annular axially inner end portion disposed longitudinally inwardly of said flange and having an unstressed inside diameter substantially equal to the diameter of said male element bore and a radially outer frusto-conical surface narrowing from said first portion and arranged to abut said flared shoulder of the female element, said rounded end of the flange being juxtaposed to the rounded shoulder of the female element in the tube retaining disposition effectively dividing the insert into radially and axially spaced annular portions.

2. A fitting for use with tubing having an irregular outer surface, comprising: a female element provided with a bore having an axially inner portion adapted to receive an end of the tubing with which the fitting is to be used, an axially outer enlarged cylindrical portion, and a flared shoulder between said portions; a male element provided with a cylindrical portion receivable in said bore outer portion, a constrictible reduced annular flange extending coaxially and widening axially inwardly from the last named cylindrical portion, and a bore through said male element extending coaxially of the female element bore and having an original diameter substantially equal to the outside diameter of the tubing with which the fitting is to be used; and an annular insert secured to said flange, said insert being formed of a hard plastic sealing material having resistance to cold flow and provided with an axially outer first portion having a recess receiving said flange of the male member, the minimum diameter of said recess being less than the maximum diameter of said flange, said first portion being further provided with a radially outer surface arranged to engage the female element in the cylindrical outer portion of the bore thereof, said insert further having an annular axially inner end portion disposed longitudinally inwardly of said flange and having an inside diameter substantially equal to the diameter of said male element bore and a radially outer frusto-conical surface narrowing axially inwardly from said first portion and arranged to abut said flared shoulder of the female element, said flared end of the flange being juxtaposed to the flared shoulder of the female element in the tube retaining disposition effectively dividing the insert into radially and axially spaced annular portions.

References Cited in the file of this patent

UNITED STATES PATENTS

| | | |
|---|---|---|
| 648,187 | Bright | Apr. 24, 1900 |
| 1,143,815 | Duffy | June 22, 1915 |
| 2,182,811 | Kocher | Dec. 12, 1939 |
| 2,405,822 | Franck | Aug. 13, 1946 |
| 2,932,531 | Briechle | Apr. 12, 1960 |

FOREIGN PATENTS

| | | |
|---|---|---|
| 333,758 | Great Britain | July 10, 1930 |